United States Patent Office 3,600,265
Patented Aug. 17, 1971

3,600,265
ORIENTED FOAM LAMINAR STRUCTURES
Leon Edward Wolinski, Buffalo, N.Y., assignor to E. I. du Pont de Nemours and Company, Wilmington, Del.
No Drawing. Filed Apr. 16, 1970, Ser. No. 29,234
Int. Cl. B32b 3/12
U.S. Cl. 161—160  5 Claims

ABSTRACT OF THE DISCLOSURE

A laminar structure comprising oriented foam having paper and thermoformable thermoplastic film bonded to a first and second side of the foam, respectively.

BACKGROUND OF THE INVENTION

Certain laminar foam laminer structures have recently been found which provide a wide variety of desirable characteristics in such diverse applications as folding cartons, decorative panelling, and food containers. However, high stress applications have been encountered in which a higher product strength would be desirable than is available in existing products.

SUMMARY OF THE INVENTION

This invention relates to a structure uniquely suited for heavy duty packaging and decorative applications.

Specifically, the instant invention provides a laminar structure comprising, and bonded together in the order specified, (a) paper,
(b) a core of oriented closed cell foam having an elongation of less than about 50% and consisting essentially of styrene polymer having a tensile modulus greater than 150,000 p.s.i., and
(c) thermoplastic film having a tensile modulus greater than 150,000 p.s.i. and theromoformable within a temperature of about from 50° to 230° C.

DESCRIPTION OF THE PREFERRED EMBODIMENTS

Oriented closed cell foams and thermoplastic films which can be used in the instant invention include those described in detail in copending, coassigned application Ser. No. 848,206, filed Aug. 7, 1969, hereby incorporated by reference, and wherein the laminated structure comprises a core of closed cell foam having been biaxially stretched from about 2 to 12 times in each of two mutually perpendicular directions. The particular combination of the specified styrene polymer foams and thermoplastic films contributes to the deep embossability and thermoformability of the laminates, as well as their other desirable physical characteristics.

The structures of the present invention comprise a paper bonded to one side of the foam core. The paper contributes to the structural strength of the laminate, and can be any paper having the weight and surface finish suitable for the particular end application of the laminate. Preferred papers include those having an extensibility of at least 50%, such as those described in Cluett, U.S. Pat. 2,624,245, hereby incorporated by reference.

In the preparation of the instant products, the sequence in which the lamination is carried out is not critical. The thermoplastic film can be bonded to the foam core using adhesive or non-adhesive bonding techniques, as are more fully described in the aforementioned application Ser. No. 848,206. Similarly, the paper can be bonded by adhesive or non-adhesive techniques. Non-adhesive bonding can be effected by preheating the surface of the foam core and applying the fibrous paper to the preheated surface under pressure to obtain wetting contact at the interface. In non-adhesive lamination, the surface of the foam should generally be heated to at least about 10° C. below the crystalline melting point of the foam.

Generally, however, for ease of manufacture, an adhesive bond at the foam-paper interface is preferred. Adhesives which can be used include those described in application Ser. No. 848,206, and can be applied to the interface immediately prior to the point at which they are joined. Pressures of about from 50 to 100 p.s.i. are generally applied to insure a strong bond between the layers.

The instant products are embossable and thermoformable, and provide a high degree of strength and puncture resistance. Accordingly, in addition to basic folding carton and container applications, they are particularly well suited for use as embossed wall coverings and other decorative purposes. The paper layer, presumably due to the flexibility of the foam substrate, exhibits remarkable resistance to rupture in creasing and forming operations, even when non-extensible papers are used. The products provide a unique combination of design flexibility and economical construction. The thermoplastic film layer can provide a high gloss, printable surface and maximum forming capability, while the paper layer provides a containment of the foam layer that contributes to exceptional strength and rigidly as a result of the I-beam type of structure.

The laminates of the instant invention accordingly exhibit Mullen Burst and Ring Crush strengths in excess of the additive strength of the components and an elongation greater than would be expected based on the elongation of the least extensible component.

The invention is further illustrated by the following specific example.

EXAMPLE

A laminate is prepared from oriented polystyrene foam sheet having a thickness of 45 mils and a density of 7 lbs./ft.$^3$. A 2 mil thickness of "Styron 495" high impact polystyrene is melt extruded onto one surface of the foam at a melt temperature of 250° C. and the product is passed through a set of nip rolls having a gap setting of about 35 mils. A 5 mil thickness of "Cluepak" extensible paper is laminated to the second side of the foam by melt extruding "Elvax 4260" ethylene vinyl acetate adhesive at a temperature of 212° C. at a thickness of about 1 mil between the surface of the polystyrene foam and the paper and subsequently passing the laminate through a set of nip rolls having a gap setting of about 35 mils.

The resulting paper/foam/film laminate is found to exhibit the following physical characteristics, the variations between machine direction (MD) and transverse direction (TD) being indicated where appropriate.

| | MD | TD |
|---|---|---|
| Bond strength (g./in.): | | |
| Paper/foam | 170 | 230 |
| Foam/film | 450 | 410 |
| Taber stiffness (T.V.)/mils | 528/46 | 400/48 |
| Mullen burst (lbs.):[1] | | |
| Paper surface toward diaphragm | 103 | |
| Plastic surface toward diaphragm | 88 | |
| Elmendorf tear (gms.)[2] | 535 | 846 |
| Elongation (percent)[3] | 11 | 5 |
| Tenacity (K p.s.i.)[4] | 1.275 | 0.89 |
| Modulus (K p.s.i.)[4] | 57.6 | 47.8 |
| IPV (g./100 m.$^2$/hr.) | 157 | |
| Oxygen transmission (cc./24 hrs./100 in.$^2$/st.) | 72.1 | |

[1] ASTM-D-774.
[2] ASTM-D-689.
[3] ASTM-D-882, Method A.
[4] ASTM-D-882.

The laminate is found to pass the Board Research Development Association creasing test, in that the material is satisfactorily creased without breakage. The laminate is also satisfactorily cut and creased on commercial carton equipment and embossed to a depth of 50 mils without fracture of either surface material.

I claim:

1. A laminar structure comprising, and bonded together in the order specified,
   (a) paper,
   (b) a core of oriented closed cell foam having been biaxially stretched about from 2 to 12 times in each of two mutually perpendicular directions, the foam having an elongation of less than about 50% and consisting essentially of styrene polymer having a tensile modulus greater than 150,000 p.s.i., and
   (c) thermoplastic film having a tensile modulus greater than 150,000 p.s.i. and thermoformable within a temperature of about from 50° to 230° C.

2. A laminar structure of claim 1 wherein the thermoplastic film consists essentially of styrene polymer.

3. A laminar structure of claim 1 wherein the thermoplastic film consists essentially of vinyl chloride polymer.

4. A laminar structure of claim 1 wherein the paper has an extensibility of at least 50%.

5. A laminar structure of claim 1 wherein the paper has an extensibility of about 100% of its length.

References Cited

UNITED STATES PATENTS

| | | | |
|---|---|---|---|
| 2,770,406 | 11/1956 | Lane | 161—161 |
| 3,229,814 | 1/1966 | Cowman | 161—161 |
| 3,398,035 | 8/1968 | Cleereman et al. | 161—161 |
| 3,431,164 | 3/1969 | Gilbert | 161—161 |
| 3,502,532 | 3/1970 | Frielingsdorf | 161—161 |

WILLIAM J. VAN BALEN, Primary Examiner

U.S. Cl. X.R.

156—309; 161—161, 252, 270, 402